US012691862B2

(12) United States Patent
Arioli et al.

(10) Patent No.: US 12,691,862 B2
(45) Date of Patent: Jul. 28, 2026

(54) METHOD FOR AUTOMATICALLY DETECTING, BY MEANS OF COMPUTERIZED PROCESSING, OF THERMAL INFORMATION ABOUT A SURFACE OF A BRAKE DISC UNDER DYNAMIC OPERATING CONDITIONS

(71) Applicant: Brembo S.p.A., Curno (IT)

(72) Inventors: Francesca Maria Arioli, Curno (IT); Danilo Benetti, Curno (IT); Andrea Cerutti, Curno (IT); Pietro Andrea Grilli, Curno (IT); Cristian Malmassari, Curno (IT); Nicoló Nepote, Curno (IT); Luigi Roggia, Curno (IT); Diego Scarpellini, Curno (IT)

(73) Assignee: Brembo S.p.A., Curno (IT)

( * ) Notice: Subject to any disclaimer, the term of this patent is extended or adjusted under 35 U.S.C. 154(b) by 236 days.

(21) Appl. No.: 18/720,920

(22) PCT Filed: Dec. 19, 2022

(86) PCT No.: PCT/IB2022/062454
§ 371 (c)(1),
(2) Date: Jun. 17, 2024

(87) PCT Pub. No.: WO2023/119111
PCT Pub. Date: Jun. 29, 2023

(65) Prior Publication Data
US 2025/0050859 A1      Feb. 13, 2025

(30) Foreign Application Priority Data

Dec. 23, 2021    (IT) ........................ 102021000032399

(51) Int. Cl.
*G06K 9/00* (2022.01)
*B60T 17/22* (2006.01)
(Continued)

(52) U.S. Cl.
CPC .............. *B60T 17/22* (2013.01); *F16D 66/00* (2013.01); *G01J 5/0066* (2013.01); *G06V 10/25* (2022.01);
(Continued)

(58) Field of Classification Search
CPC .... B60T 17/22; F16D 66/00; F16D 2066/001; G01J 5/0066; G01J 2005/0077;
(Continued)

(56) References Cited

U.S. PATENT DOCUMENTS 10,819,923 B1 * 10/2020 McCauley ............... G06N 3/09
12,482,088 B2 * 11/2025 Henig .................... H04N 23/23

FOREIGN PATENT DOCUMENTS

DE        19940463 A1     3/2001
EP        1992940 A1    11/2008
(Continued)

OTHER PUBLICATIONS

European Patent Office, International Search Report and Written Opinion in Application No. PCT/IB2022/062454, dated Mar. 23, 2023, 12, pages, Rijswijk, Netherlands.

*Primary Examiner* — Xin Jia
(74) *Attorney, Agent, or Firm* — Marshall & Melhorn, LLC

(57) ABSTRACT

A method for automatically detecting, by means of computerized processing, information about temperature evolution and/or about location/distribution of hot spots and/or bands and/or zones on the surface of a brake disc under dynamic operating conditions. The method includes the steps of acquiring a plurality of digital images and/or a digital video,
(Continued)

obtaining a representation of each of the digital images and/or digital video frames in the form of matrix data, on which to perform a processing by means of algorithms comprising image analysis or "computer vision" algorithms, to obtain and provide information about temperature evolution and/or about location/distribution of hot spots and/or bands and/or zones on the zone of interest of the surface of a brake disc.

18 Claims, 7 Drawing Sheets

(51) Int. Cl.

| | |
|---|---|
| *F16D 66/00* | (2006.01) |
| *G01J 5/00* | (2022.01) |
| *G06V 10/25* | (2022.01) |
| *G06V 10/26* | (2022.01) |
| *G06V 10/30* | (2022.01) |
| *G06V 10/34* | (2022.01) |

(52) U.S. Cl.
CPC .............. *G06V 10/26* (2022.01); *G06V 10/30* (2022.01); *G06V 10/34* (2022.01); *F16D 2066/001* (2013.01); *G01J 2005/0077* (2013.01)

(58) Field of Classification Search
CPC ......... G01J 2003/421; G01J 2005/0033; G01J 5/0022; G01J 5/026; G06V 10/25; G06V 10/26; G06V 10/30; G06V 10/34
See application file for complete search history.

(56) References Cited

FOREIGN PATENT DOCUMENTS

| | | | | | |
|---|---|---|---|---|---|
| FR | 2970331 A1 | * | 7/2012 | .............. | G01J 5/602 |
| KR | 101723015 B1 | * | 4/2017 | ............... | G01J 5/48 |

* cited by examiner

Rad_025.mat

METHOD FOR AUTOMATICALLY DETECTING, BY MEANS OF COMPUTERIZED PROCESSING, OF THERMAL INFORMATION ABOUT A SURFACE OF A BRAKE DISC UNDER DYNAMIC OPERATING CONDITIONS

FIELD

The present invention relates to a method for automatically detecting, by means of computerized processing, thermal information on the surface of a brake disc under dynamic operating conditions.

In particular, the present invention is directed to a method for automatically detecting information about temperature evolution and/or about location/distribution of hot spots and/or bands and/or zones on the surface of a brake disc for a vehicle braking system, during dynamic bench tests.

BACKGROUND

The dissipation of the heat generated during a braking event is one of the most critical issues in the assessment of the performance of a braking system.

In the case of brake discs, the heat generated in friction members (pads and braking surface) induces thermal distortions in the disc which can lead to localized contact areas between the mechanical elements and to the development of thermal hot spots. Hot spots are regions of the braking band characterized by high thermal gradients.

The formation of thermal hot spots during braking events can lead to several negative consequences.

From the material point of view, it has been demonstrated that the thermomechanical stress due to the presence of thermal hot spots can induce traction and compression stress cycles with plastic deformation variations.

The presence of thermal hot spots can also affect the appearance and evolution of cracks on the surface of the disc.

Finally, from the driving point of view, it is known that high temperatures in the braking system can deteriorate the braking performance, inducing "fading" or "hot judder" phenomena, i.e., undesired low frequency vibrations.

It is thus extremely important to analyze the phenomenon of thermal hot spots in brake discs under dynamic conditions, both to appropriately characterize the brake discs and to obtain indications on how to improve the designs of the brake discs themselves.

Currently, the standard procedure for studying the phenomenon of hot spots provides testing the braking system on a dynamometer test bench. An experimental setup is provided on the bench in order to allow the acquisition of images representative of temperature information, e.g., by test instruments provided with thermal imaging cameras.

Each test provides for the application of a series of braking actions, predefined in terms of operating parameters, and the frames acquired for each braking action can be combined in sequence to form a video.

However, to analyze the relationships between the temperature distribution on the disc and complex physical phenomena such as, for example, the onset of deformations and vibrations, the standard analysis tools provided with currently known test tools are at least partially lacking or unsuitable.

In fact, although the currently available standard software for known thermal imaging cameras allow the automatic extraction of some information, such information is not sufficient for performing the above analyses in a satisfactory manner.

For this reason, the prior art in this domain provides that the videos provided by thermal imaging cameras are inspected individually and visually by specialized operators, in order to record information on non-uniformities in the temperature distribution such as hot spots, cold zones and hot bands, i.e., circular crowns at a higher temperature as compared to the surrounding areas. From these features, the number, size and metrics related to the temperature values thereof are recorded.

This known information extraction procedure is extremely time consuming, since it requires that the acquired videos are individually screened by a qualified operator.

Furthermore, such a procedure is typically affected by an operator's bias, giving rise to results that are not very objective and not very repeatable.

As disclosed above, many needs thus remain unmet in the domain of the detection and analysis of information relating to thermal hot spots in brake discs under dynamic operating conditions, needs for which the solutions known to date do not provide fully effective solutions.

SUMMARY OF THE INVENTION

The present invention is thus directed to a method for detecting and analyzing thermal information related to a brake disc under dynamic operating conditions.

In particular, it is the object of the present invention to provide a method for automatically detecting, by means of computerized processing, information about temperature evolution and/or about localization/distribution of hot spots and/or bands and/or zones on the surface of a brake disc under dynamic operating conditions which allows at least partially obviating the drawbacks complained of above with reference to the prior art and responding to the aforementioned needs particularly felt in the technical field considered. Such an object is achieved by a method according to claim 1.

Further embodiments of such a method are defined in claims 2-18.

BRIEF DESCRIPTION OF THE DRAWINGS

Further features and advantages of the method according to the invention will become apparent from the following description of preferred embodiments, given by way of non-limiting indication, with reference to the accompanying drawings, in which.

DETAILED DESCRIPTION

Figure 1:
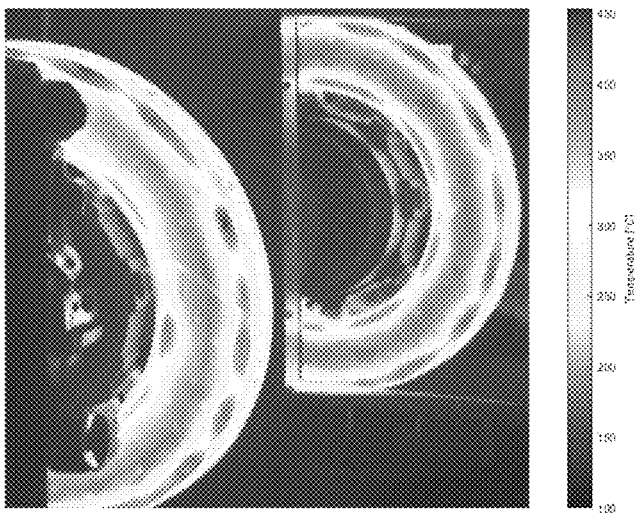
FIG. 1 illustrates an example of a framing obtainable in a digital image/video acquisition step, provided in an embodiment of the method of the invention.

With reference to FIGS. 1-9, there is described a method for automatically detecting, by means of computerized processing, information about temperature evolution and/or about location/distribution of hot spots and/or bands and/or zones on the surface of a brake disc under dynamic operating conditions.

The method comprises the steps of acquiring a plurality of digital images and/or a digital video, obtaining a representation of each of the digital images and/or digital video frames in the form of matrix data, on which to perform a processing by means of algorithms comprising image analysis or "computer vision" algorithms, to obtain and then provide information about temperature evolution and/or about location/distribution of hot spots and/or bands and/or zones on the zone of interest of the surface of a brake disc.

The aforesaid acquiring step comprises acquiring, by means of at least one thermal imaging camera, during the evolution of the aforesaid dynamic operating conditions, a plurality of digital images and/or a digital video, comprising a plurality of digital frames, of at least one zone of interest of the brake disc to be thermally characterized. Each of such digital images and/or each of such digital video frames depicts, by means of a color map, the temperatures detected at each point.

The aforesaid processing step comprises the following steps: identifying the zone of interest by generating a mask based on an analysis of the plurality of digital images and/or digital video frames acquired; then, applying the generated mask to each of the digital images and/or digital video frames acquired and obtaining processed matrix data related to the zone of interest; then, defining the area of analysis and performing a thermal analysis on the data related to the defined area of analysis, to obtain information on the temperature evolution on each point of interest; finally, identifying hot points based on the aforesaid information on the temperature evolution on each point of interest.

The aforesaid providing step includes providing the obtained information in the form of digital images or graphics and/or digital tables and/or digital video.

According to an embodiment of the method, the aforesaid zone of interest comprises at least one braking band of the disc.

According to another embodiment of the method, the aforesaid zone of interest comprises two mutually corresponding braking bands on the two respective side surfaces of the brake disc.

In this case, the aforesaid acquiring step comprises acquiring a plurality of digital images and/or a digital video by means of at least two thermal imaging cameras, one for each braking band of interest.

In accordance with another embodiment of the method, the aforesaid zone of interest comprises two mutually corresponding braking bands on the two respective side surfaces of the brake disc.

In this case, the aforesaid acquiring step comprises acquiring a plurality of digital images and/or a digital video, by means of a thermal imaging camera and at least one mirror, so that the thermal imaging camera directly acquires the digital image and/or digital video of a part of interest of one braking band, and further acquires the reflection, provided by the at least one mirror, of the digital image and/or digital video of a part of interest of the other braking band, located on the opposite side surface of the brake disc with respect to that at which the thermal imaging camera is located.

According to an embodiment of the method, the aforesaid zone of interest comprises portions of one or more braking bands of the brake disc.

In accordance with an embodiment of the method, the aforesaid operating conditions comprise at least one braking event or a braking test.

According to an implementation option, the aforesaid operating conditions comprise at least one brake disc bench test, where each test comprises multiple braking test events.

In accordance with an implementation option of the method, the aforesaid operating conditions comprise a plurality of tests performed on a brake disc bench, where the tests, belonging to such a plurality of tests, to be performed in a sequence of tests, are selectable by an operator supervising the tests.

In accordance with an embodiment of the method, each test comprises a plurality of test braking events; each test braking event comprises in turn an analysis on each of the sides of the brake disc; each analysis on a brake disc side comprises in turn an analysis for each frame of the digital video that is captured on such a side; each frame analysis comprises in turn an analysis on a portion of the frame depicting a respective portion of the zone of interest.

According to an implementation option, some steps of the method are common to all the tests of the aforesaid plurality of tests, whereas other steps are individually conducted on each frame or on each of a set of predefined frame portions. Such steps conducted individually are then extended to the entire test according to a nested structure: for each test, for each braking action, for each side of the brake side, for each frame and for each predefined frame portion.

In accordance with an embodiment of the method, the aforesaid steps of identifying the zone of interest by generating a mask and of applying the generated mask to each of the acquired digital images and/or digital video frames comprise processing by means of a computer a set of digital images or digital video frames deemed significant for analysis.

Such a processing step comprises in turn, for each digital image or digital image frame considered significant, the following steps:

forcing negative temperatures or temperatures lower than a lower temperature threshold (for example, 10° C.) to a low or zero value (typically to 0);

applying a filter to the digital image or video frame to reduce noise;

applying an Otsu segmentation to the digital image or video frame;

averaging per pixel on the time axis, obtaining a respective averaged digital image or averaged digital video frame;

applying an Otsu segmentation to the averaged digital image or averaged digital video frame to obtain a respective segmented digital image or segmented digital video frame;

recognizing the edges of the brake disc by means of an edge recognition algorithm, and removing the edges from the segmented digital image or segmented digital video;

refining the mask by means of an image cleaning algorithm, to finally obtain a processed digital image or processed digital video.

According to an implementation option, the digital data obtained, corresponding to the aforesaid processed digital image or processed digital video, are organized in a matrix form, thus obtaining the aforesaid processed matrix data related to the zone of interest.

In accordance with an implementation option, the step of obtaining processed matrix data further comprises transforming the Cartesian coordinates associated with the indices of the matrices forming the frames into a polar coordinate system.

According to an implementation option, if each test comprises multiple braking events, the set of digital images or digital video frames deemed significant for analysis comprises digital images or digital video frames taken from the last N (for example 3) braking events of the test, i.e., those in which the brake disc reaches the highest temperatures and is thus more visible with respect a cold background of the image.

In accordance with an implementation option, the aforesaid edge recognition algorithm, in the recognizing step, comprises the Sobel Edge Detection algorithm.

In accordance with an implementation option, the aforesaid image cleaning algorithm, in the refining step, comprises the Binary Image Morphology algorithm, configured to perform functions of removing dirt and/or small gaps and/or small objects on the image.

According to an embodiment of the method, the aforesaid step of defining the area of analysis comprises dividing the braking band of the brake disc to be analyzed into three equal sub-zones, one inner sub-zone, one central sub-zone and one outer sub-zone, wherein each sub-zone is intended to be individually analyzed.

According to another embodiment of the method, the aforesaid step of defining the area of analysis comprises setting, by an operator by means of a command interface, and for each of the two framed braking band portions, at least one setting parameter adapted to define the area of analysis.

According to an implementation option, the setting parameters being definable by the operator are:

(i) angular width of the band of interest for the analysis;

(ii) a value for an inner radius and an outer radius on the band, adapted to delimit three sub-zones (inner, central and outer sub-zones), intended to be analyzed.

In accordance with an implementation option, each pixel of the digital image or video frame is marked to indicate whether or not it belongs to the area of analysis, and if so, to indicate to which sub-zone of analysis it belongs.

For example, a number between 1 and 3 is assigned to each pixel of each frame included in the area of analysis, which identifies the zone to which it belongs (inner, central or outer zone). If the pixel has been excluded from the area of analysis, a zero is assigned thereto.

In accordance with an embodiment of the method, the aforesaid step of performing a thermal analysis on the data related to the defined area of analysis to obtain information on the temperature evolution on each point of interest, and the aforesaid step of identifying thermal hot spots comprise the following steps:

identifying as a potential thermal hot spot any region of an analysis zone having a higher temperature, by a given percentile, than the average temperature over the analysis zone itself;

for each potential thermal hot spot, calculating the coordinates of the barycenter;

verifying one or more validity requirements on the potential thermal hot spots, and identifying as thermal hot spots only a potential thermal hot spot which fulfils the aforesaid one or more validity requirements.

According to different implementation options, the aforesaid validity requirements comprise one or more or all of the requirements listed below:

a. the area of the potential thermal hot spot is greater than a minimum hot spot area threshold;

b. the barycenter of the potential thermal hot spot is in a non-cold zone, wherein a zone is defined as cold if its average temperature is less by a given percentile than the temperature distribution on the braking band side under analysis, for example less than the median temperature of such a distribution;

c. the area of the potential thermal hot spot is less than a maximum hot spot area threshold;

d. the distance between the radial coordinates of the barycenter of two thermal hot spots is greater than a distance threshold, otherwise the two thermal hot spots are considered as one and the information on that with greater area is saved.

According to an implementation option, the method comprises the further steps of calculating the temperature variation inside each zone, and recognizing the presence of a band on the considered zone, if the aforesaid temperature variation is within a predetermined limit value of temperature variation.

According to possible embodiments of the method, the aforesaid information about temperature evolution and/or about localization/distribution of hot spots and/or bands and/or zones on the zone of interest of the surface of a brake disc comprise, for each of the thermal hot spots identified, information on position (such as geometric coordinates of the barycenter or center of gravity, for example), and/or area, and/or zone and frame on which the hot spots were found, and/or metadata identifying the braking event and/or test to which such information refers.

In accordance with an embodiment of the method, the aforesaid step of providing information on temperature evolution and/or location/distribution of hot spots and/or bands and/or zones on the zone of interest of the surface of a brake disc comprises displaying data through a computer interface.

According to different possible implementation options, such a displaying step comprises displaying the output of the algorithm, and/or displaying the time trend (for example by means of a line graph) of the number of thermal hot spots, in total or divided by zone, and/or displaying the data related to the presence or absence of hot bands for each frame, globally or divided into zones, and for each of the two sides of the disc.

According to an implementation option, the displaying step also comprises displaying a reprocessed version of the original digital video frames.

For example, the digital video frames are recolored highlighting the pixels above the $95^{th}$ and below the $5^{th}$ temperature percentile within the same frame and considered to belong to the same braking band; or, the pixels corresponding to the center of gravity of the detected thermal hot spots are marked on the digital video frames.

According to an implementation option, the displaying step further comprises aggregating the reprocessed digital video frames based on the output of the algorithm in order to recreate a video.

Again referring to FIGS. 1-9, further details of the method will be given below merely by way of non-limiting example, according to a particular embodiment of the invention.

In this example, a "computer vision" algorithm is considered, which is capable of automatically extracting the information on the temperature evolution and distribution of hot spots on the surface of a brake disc from videos acquired with a thermal imaging camera during dynamic bench tests.

It should be noted that the term "thermal imaging camera" indicates any electronic means capable of detecting thermal information (for example, temperature detection, e.g., by receiving infrared rays) from a framed object, and providing as output a digital image or video in which the thermal information is in some way depicted (for example, in the form of color maps).

This implementation example is directed to a process for detecting thermal information on a brake disc subjected to test bench testing.

The process is disclosed below with reference to the two steps of acquiring data on the test bench and processing such data.

As far as the data acquisition step is concerned, in this implementation example the braking system is tested on a test bench, on which an experimental acquisition setup is provided.

In this example, the temperature evolution over time on the two braking bands of the disc is recorded using a thermal imaging camera and a mirror. The thermal imaging camera is positioned so as to directly frame a portion of the braking band and to indirectly frame a band portion on the opposite side of the disc, through the mirror reflection.

The acquisition is performed while the disc is rotating, and the acquisition rate of the thermal imaging camera is such that the rotating disc portion framed is always the same for the entire duration of the braking action. An example of a framing obtainable through this acquisition step is shown in FIG. 1.

Each test provides for the application of a series of braking actions, predefined in terms of operating parameters (for example, initial speed and final speed, pressure of the braking system or deceleration of the vehicle, system temperature at the start of braking). Relevant data are stored in different frame variables "Frame_00N", one for each video frame, numbered accordingly. Each frame variable contains a float array having certain dimensions (video height)× (video width).

As previously noted, in this description the term frame or digital frame is used to indicate the set of data corresponding to a framing of the thermal imaging camera.

In the example disclosed herein, the frames acquired for each braking action are combined in sequence to form a video. The video in matrix format (an example of such a format is MATLAB MAT) is the output of the thermal imaging camera.

In this example, the data are stored as files on a file system and organized into folders. Each folder represents a different test and contains different video files. The files are numbered as position of the corresponding braking event in the sequence of all the braking events of the given test.

Figure 2:
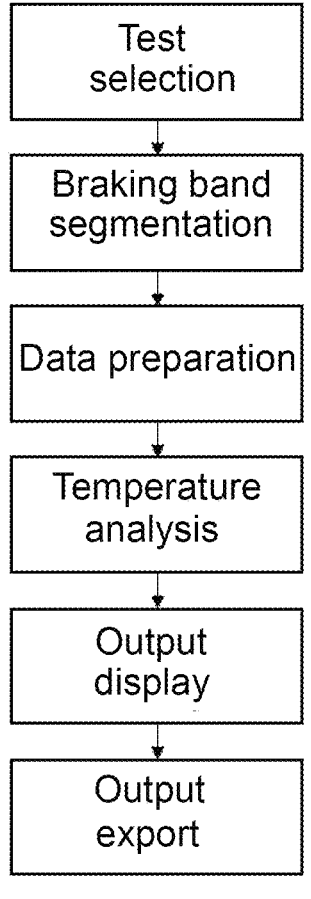
FIG. 2 shows a simplified flow diagram of the steps included in an embodiment of the method according to the invention.

The acquisition step is followed by the data processing step, the logical stages of which are described in FIG. 2.

The analysis unit can vary at each step. Some operations take place only once for each test, others are performed individually on each frame or portion thereof and are extended to the entire test according to a nested structure of the type: for each test, for each braking action, for each side of the disc, for each frame, for each portion (as previously mentioned).

Figure 3:
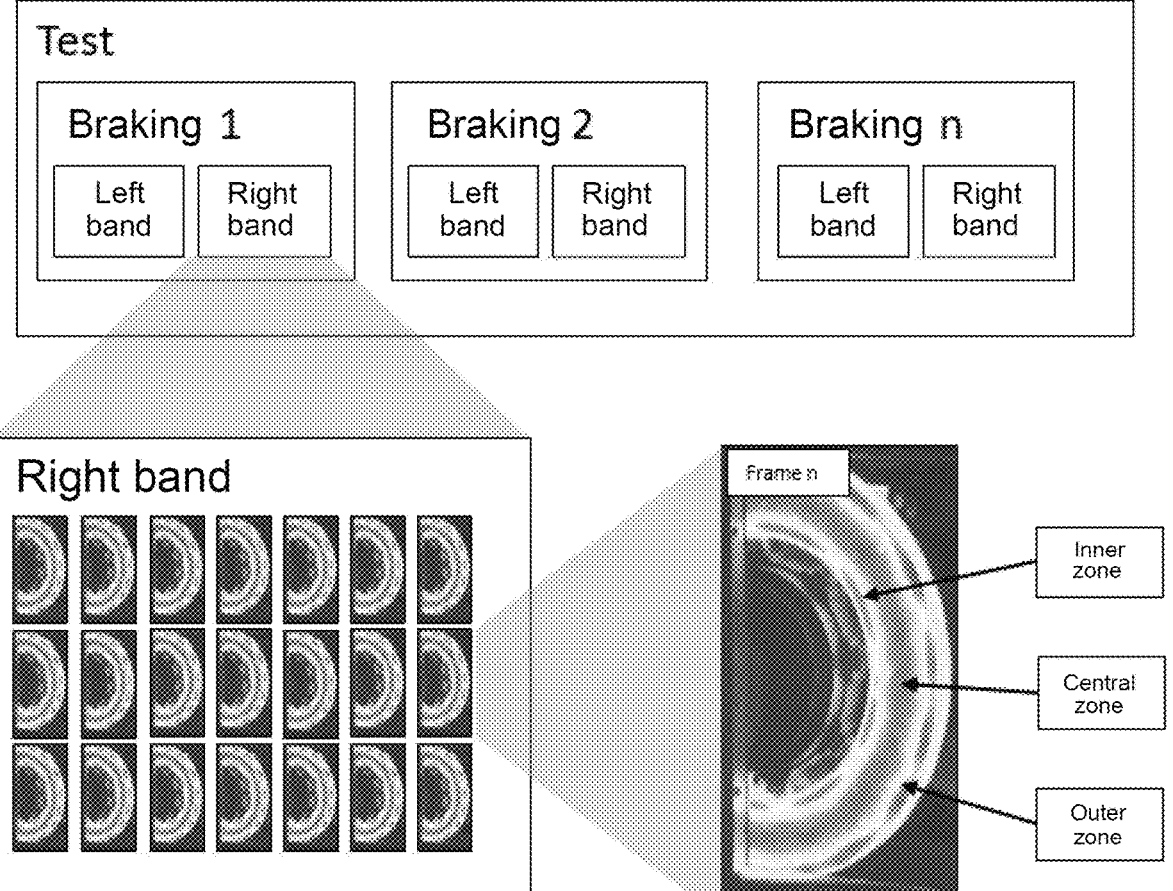
FIG. 3 illustrates a hierarchy of analyses performed in an embodiment of the method according to the invention.

This hierarchy is shown in FIG. 3, where, consistently with the example described herein, three portions of the braking band have been isolated for each frame: inner, central and outer portions.

The interaction with the user takes place due to a software application having a graphic user interface (GUI), for example a specially developed GUI.

The first step includes choosing, by the user, the test to be analyzed. The software application allows the user to choose a folder containing the videos related to all the braking actions related to the chosen test.

The next step includes generating a mask corresponding to the zone of analysis that is interesting for this application, i.e., the braking band of the disc.

Figure 4:
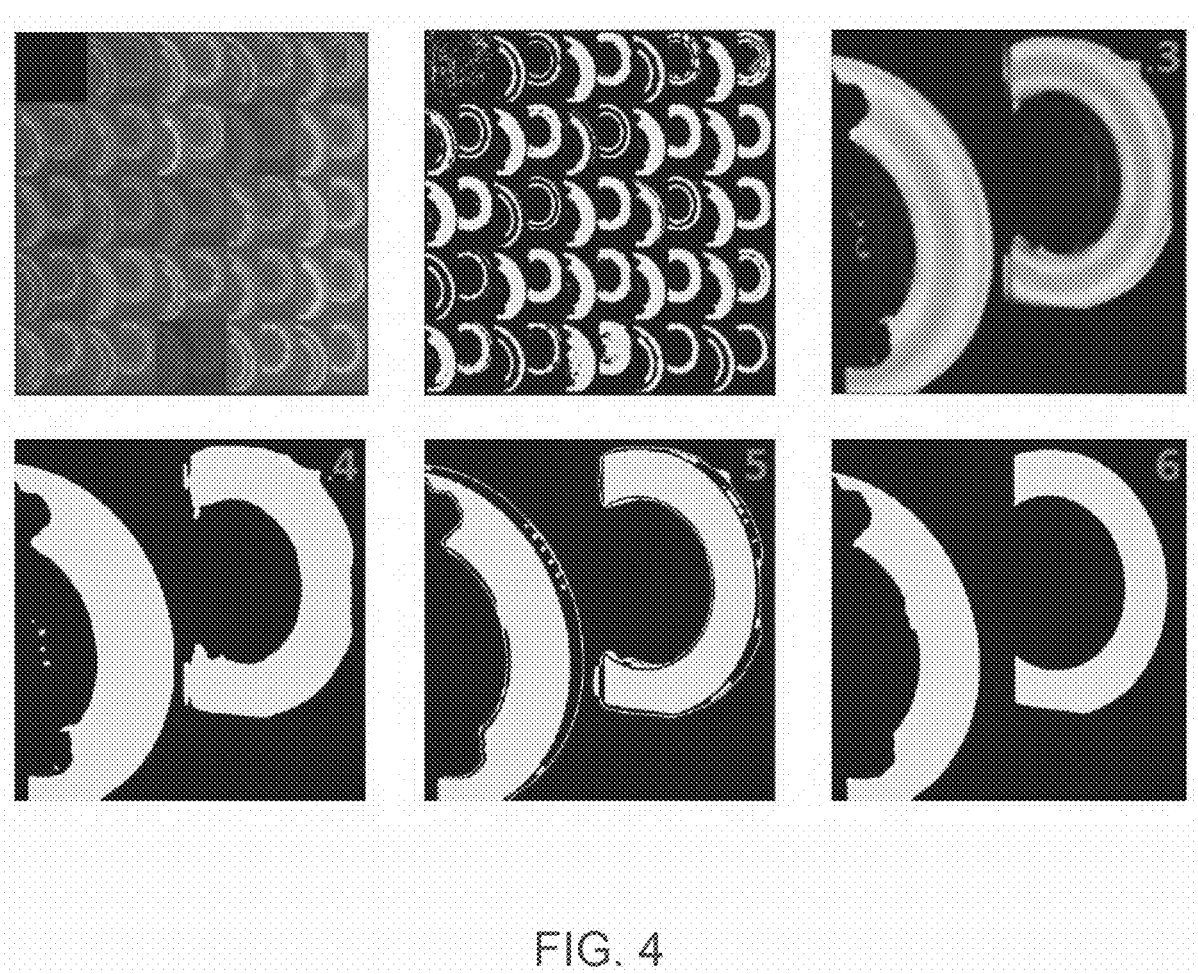
FIG. 4 illustrates different image processing steps, provided in a mask definition procedure, comprised in an embodiment of the method according to the invention.

To obtain the mask, the algorithm used in this implementation option of the method performs the following operations (illustrated in FIG. 4):

it takes as input for each test the videos of the last three braking actions, i.e., those in which the disc reaches the highest temperatures and is thus more visible with respect to the cold background of the image;

the negative or lower temperatures than a certain threshold value (for example 10° C.) in each frame are forced to take a 0 value;

a filter is applied to each frame to reduce noise (box 1 in FIG. 4);

the Otsu segmentation is applied to each frame (box 2 in FIG. 4); the Otsu segmentation (or Otsu method) is a method, known per se, for an automatic thresholding of the histogram in the digital images;

average per pixel on the time axis (box 3 in FIG. 4);

Otsu segmentation again (box 4 in FIG. 4);

recognition of the edges of the disc by Sobel Edge Detection (algorithm known per se) and removal thereof (box 5 in FIG. 4);

refining the mask by Binary Image Morphology (algorithm known per se, for example with removal of dirt, small gaps, small objects) (box 6 in FIG. 4).

Downstream of this processing, the operator can accept the mask proposal suggested by the algorithm or further modify it based on his/her needs.

The comparison is made possible by the superposition, in the GUI, of the mask and a video frame of the test in which the braking band is clearly visible in the background.

In an implementation option, the operator can, through the GUI:

1. enlarge or shrink the mask;

2. redefine the outlines of the two figures in the mask based on the intersections with ellipses identified in the figure by a RANSAC algorithm;

3. completely remodel the mask by manipulating the control points of the interpolating Bezier curve.

Typically, this operation is performed once for the whole test.

Figures 5, 6:
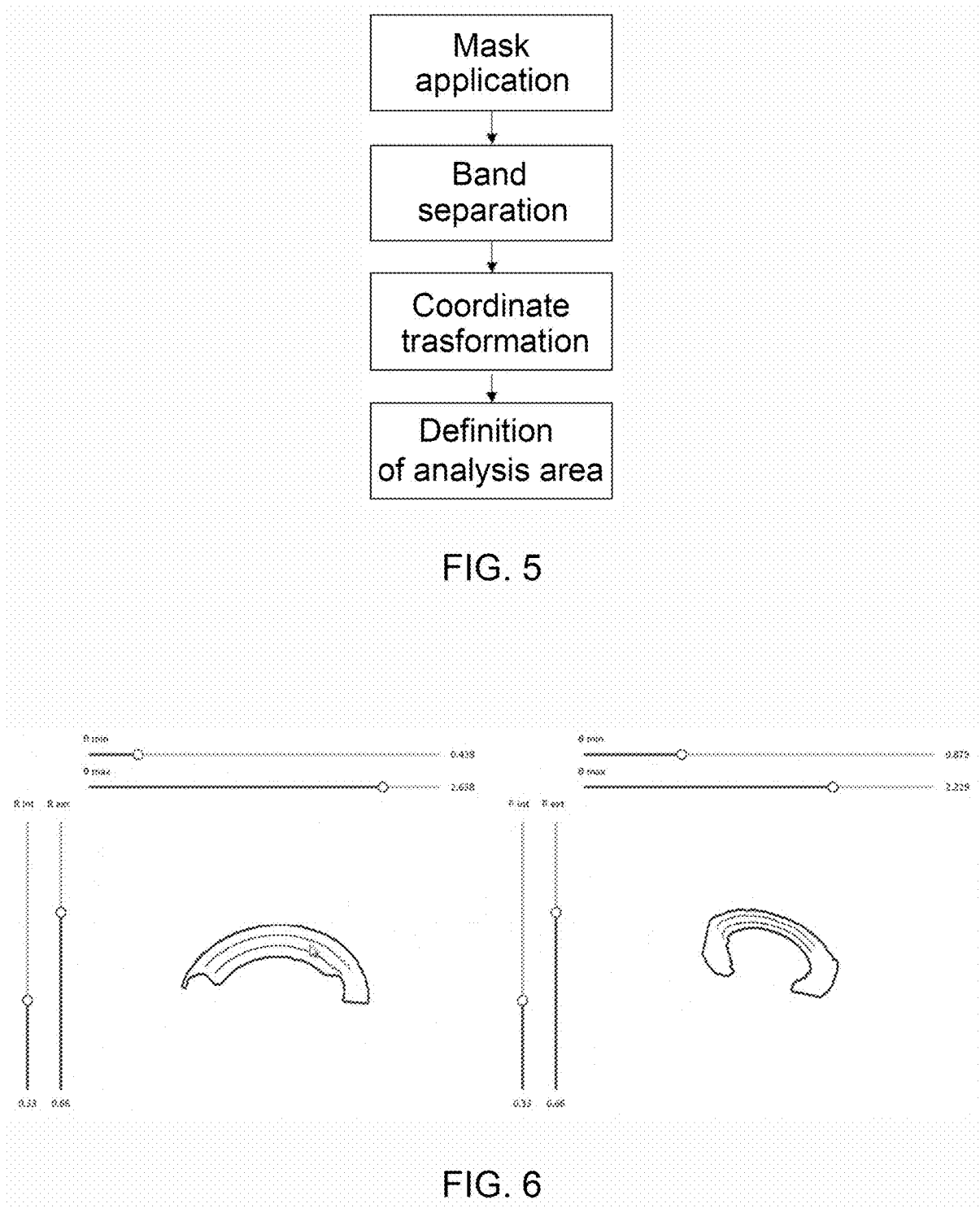
FIG. 5 shows a simplified flow diagram of the steps included in the "data preparation" block in FIG. 2, according to an implementation option.
FIG. 6 shows an example of setting input parameters for the search and validation of the hot spots, according to an embodiment of the method according to the invention.
Figure 7:
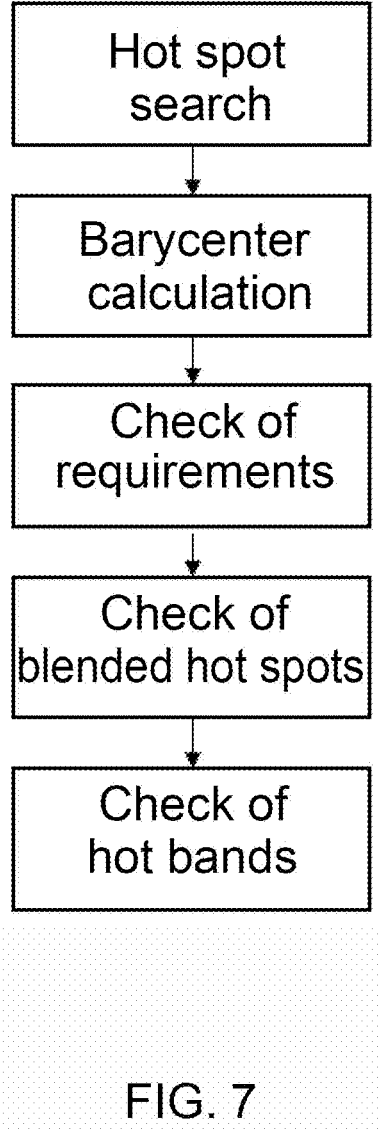
FIG. 7 shows a simplified flow diagram of the steps included in the "temperature analysis" block in FIG. 2, according to an implementation option.

Once the desired mask is defined, in this implementation option, some data processing operations, preparatory to the actual temperature analysis, are performed. Such operations are depicted in FIG. 5 and are performed on each frame of each braking action in the test.

First, the mask is applied to each frame of the braking action. Each frame is then automatically divided into two parts, each relating to one side of the braking band and which contains it entirely. The cut is such that only one of the width and length of the frame varies. Moreover, there is only one position index defined for the cut, since the framing remains still for the entire duration thereof. From here on, the frames related to the two sides of the braking band are processed in parallel.

The next step includes transforming the Cartesian coordinates associated with the indices of the matrices forming the frames into a system of polar coordinates that are more natural given the shape of the objects being analyzed.

Downstream of this step, in this implementation example it is required for the user to declare, through the GUI (see FIG. 6) and for each of the two portions of braking band framed, the following parameters.

1. The angular width of the band of interest for analysis; the user is invited to choose a zone where the width of the band is roughly constant; in fact, because of the dimensions of the test bench or even the dimensions of the brake caliper only, it is almost never possible to obtain a full frame of the entire visible angular band interval.

2. A value for an inner radius and an outer radius on the band. These two values define three zones (inner, central and outer zones) on the band, on each of which different thermal patterns are normally observed. The band is divided by default into three equal zones, but the user can change these values based on the situation observed in the video.

Once these parameters have been defined and saved, an integer number between 1 and 3 is assigned to each pixel of each frame included in the area of analysis, which identifies the zone to which it belongs (inner, central or outer zone). If the pixel has been excluded from the area of analysis, a zero is assigned thereto.

The next step is that of analyzing the temperature pattern developed during the test. For each of the three zones defined on the braking band in each frame, the following operations are performed (summarized in FIG. 7).

1. Hot spot (or thermal hot spot) search, the hots spots being defined as regions with a higher temperature by a certain percentile than the temperature on the zone itself.

2. For each hot spot, calculation of the coordinates of the barycenter.

3. Check of the validity requirements:

3a. in order to eliminate small hot spots due to holes on the disc or other, a minimum threshold is set for the area of each hot spot;

3b. only the hot spots having their barycenter in non-cold zones are recognized as hot spots; a cold zone is defined as a zone the average temperature of which is less by a certain percentile than the temperature distribution on the braking band side under analysis, for example less than the median temperature of such a distribution; since the hot spots can be defined a priori on any zone, in the absence of this contrivance the hottest points of each zone, even of the cold ones, would be detected as hot spots, which is to be avoided.

4. Checking that there are no blended hot spots.

4a. Check on angularly blended hot spots.

It can occur that the hot spots defined at point 1 above are actually formed by the junction of several hot spots, thus being very extensive. This problem is solved by calibrating a threshold value for the maximum area.

If a hot spot identified at point 1 above has a larger area than the threshold, on that zone the operations at points 1-3 above are performed again, using for the search a higher percentile than that chosen at point 1. The increased-percentile processing data are saved and replace those of the previous processing in the angular portion of the zone where the too extensive hot spots were detected.

4b. Check on radially blended hot spots.

When the distance between the radial coordinates of the centers of gravity of two thermal hot spots is less than a certain threshold, they are considered as one hot spot, and the information on the initial single hot spot with greater area is saved.

5. Calculation of the temperature variation inside each zone; if such a variation lies within a certain predetermined limit value, the presence of a band is recognized on the zone.

The output of the flow of actions described above contains, for the hot spots identified, information on position (geometric coordinates of the barycenter), area, zone and frame on which they were found, in addition to the identification metadata in terms of braking action and test. These data can be aggregated at different levels and exported in table format.

Within the application it is possible to display the output of the algorithm.

In particular, once the desired braking action has been selected through a dropdown menu, various displays are made available to the user.

For example, it is possible to display the time trend of the number of the hot spots, in total or divided by zone, by means of a line graph. Moreover, due to a button on the GUI, it is possible to display the data related to the presence or absence of hot bands for each frame, globally or divided by zone. The graph can be tracked for each of the two sides of the disc.

Moreover, it is possible to display a re-elaborated version of the original frames. In particular, in the embodiment of the method described herein, at least the following options are available:

frames recolored by highlighting the pixels above the $95_{th}$ and below the $5^{th}$ temperature percentile within the same frame and considered to belong to the braking band, in order to highlight any errors in the definition thereof (for example inclusion of the ventilation chamber);

frames on which the pixels corresponding to the barycenter of the hot spots detected by the algorithm are marked.

Figure 8:
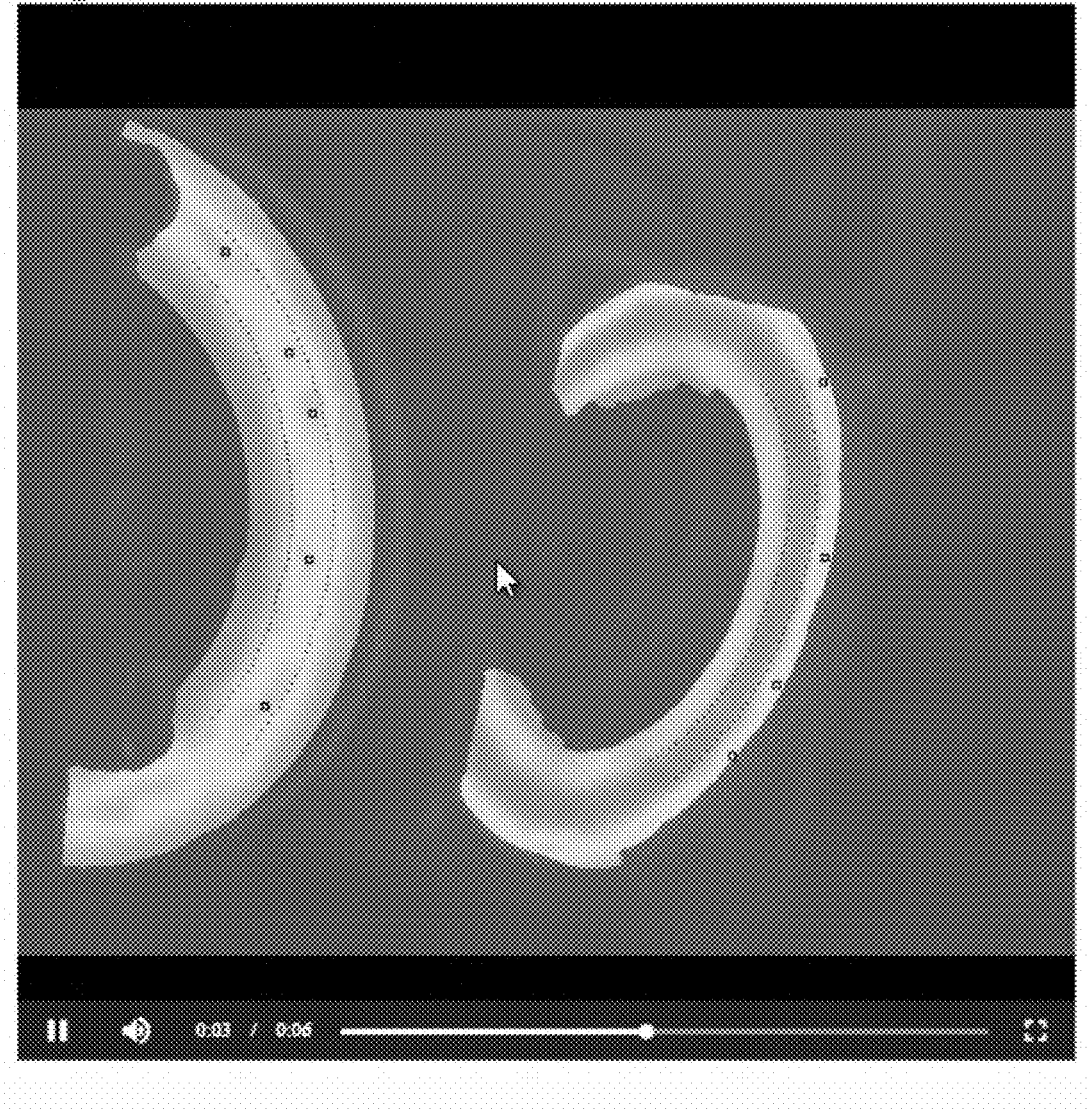
FIGS. 8 and 9 respectively illustrate a re-elaborated video and a line graph with connected frames, provided as output in respective embodiments of the method according to the invention.
Figure 9:
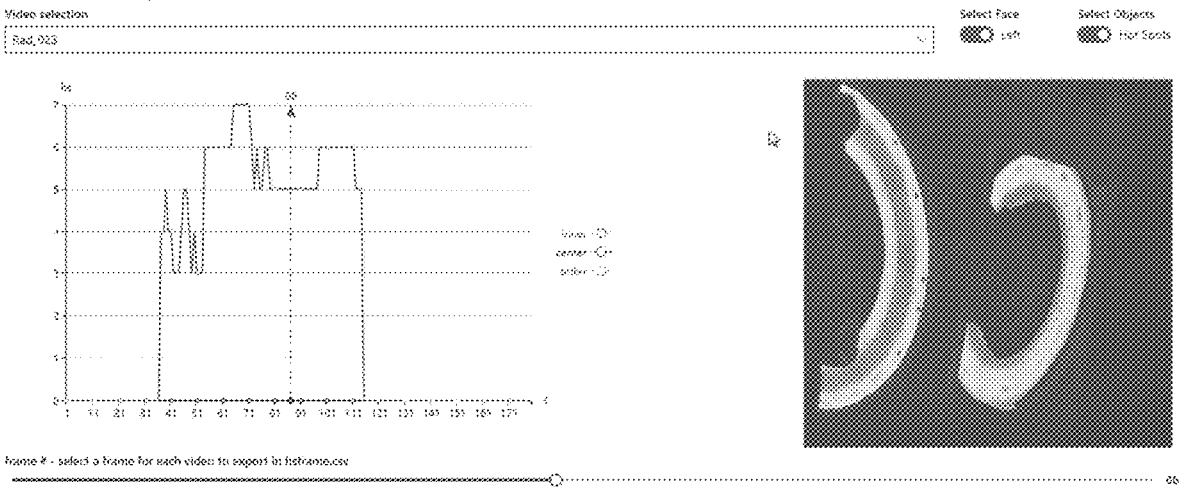

In turn, the frames re-elaborated based on the output of the algorithm can be aggregated so as to recreate a video (see FIG. 8).

Finally, it is possible to connect the individual displays. For example, it is possible to make the line graph reactive so as to show, for the frame selected on the x axis, the corresponding re-elaborated frame (see FIG. 9). This strategy allows the user to obtain a visual feedback on the result of the analysis proposed by the algorithm.

The graphic outputs, as the tabular ones, can be exported and saved by the user/operator.

As can be seen, the objects of the present invention, as previously indicated, are fully achieved by the method described above by virtue of the features disclosed above in detail. The advantages and technical problems solved by the method according to the invention have already been mentioned above, with reference to the various features and aspects of the method.

In particular, the solution described above allows an accurate, quick, objective, repeatable and inexpensive analysis of the data provided by a thermal imaging camera which frames a disc brake under dynamic conditions.

In order to meet contingent needs, those skilled in the art may make changes and adaptations to the embodiments of the method described above or can replace elements with others which are functionally equivalent, without departing from the scope of the following claims. Each of the features described as belonging to a possible embodiment can be achieved irrespective of the other embodiments described.

The invention claimed is:

1. A method for automatically detecting, by means of computerized processing, information about temperature evolution and/or about location/distribution of hot spots and/or bands and/or zones on the surface of a brake disc under dynamic operating conditions, comprising:

acquiring a plurality of digital images and/or a digital video, comprising a plurality of digital frames, of at least one zone of interest of the brake disc to be thermally characterized, by means of at least one thermal imaging camera, wherein each of said digital images and/or each of said digital video frames depicts the temperatures detected at each point by means of a color map, wherein said acquiring step is performed during the evolution of said dynamic operating conditions;

obtaining a representation of each of the digital images and/or digital video frames in the form of matrix data;

processing said plurality of digital images or plurality of digital video frames, by means of algorithms comprising image analysis or computer vision algorithms, to obtain information about temperature evolution and/or about location/distribution of hot spots and/or bands and/or zones on the zone of interest of the surface of a brake disc;

providing said obtained information in the form of digital images or graphics and/or digital tables and/or digital video;

wherein said processing step comprises:

identifying the zone of interest by generating a mask based on an analysis of the plurality of acquired digital images and/or digital video frames;

applying the generated mask to each of the digital images and/or digital video frames acquired and obtaining processed matrix data related to the zone of interest;

defining the area of analysis;

performing a thermal analysis on the data related to the defined area of analysis to obtain information about the temperature evolution at each point of interest;

identifying hot spots based on said information about the temperature evolution at each point of interest.

2. The method according to claim 1, wherein said zone of interest comprises at least one braking band of the disc.

3. The method according to claim 1, wherein said zone of interest comprises two mutually corresponding braking bands on the two respective side surfaces of the brake disc, and wherein said acquiring step comprises acquiring a plurality of digital images and/or a digital video, by means of at least two thermal imaging cameras, one for each braking band of interest.

4. The method according to claim 1, wherein said zone of interest comprises two mutually corresponding braking bands on the two respective side surfaces of the brake disc, and wherein said acquiring step comprises acquiring a plurality of digital images and/or a digital video, by means of a thermal imaging camera and at least one mirror, so that the thermal imaging camera directly acquires the digital image and/or digital video of a part of interest of one braking band, and further acquires the reflection, provided by the at least one mirror, of the digital image and/or digital video of a part of interest of the other braking band, located on the opposite side surface of the brake disc with respect to that at which the thermal imaging camera is located.

5. The method according to claim 1, wherein said zone of interest comprises portions of one or more braking bands of the brake disc.

6. The method according to claim 1, wherein said operating conditions comprise at least one braking event or braking test.

7. The method according to claim 6, wherein said operating conditions comprise at least one brake disc bench test, each test comprising multiple braking test events.

8. The method according to claim 7, wherein said operating conditions comprise a plurality of tests performed on a brake disc bench, wherein the tests, belonging to said plurality of tests, to be performed in a sequence of tests, are selectable by an operator performing the tests.

9. The method according to claim 8, wherein each test of said plurality of tests comprises a plurality of test braking events, each test braking event comprises an analysis on each side of the brake disc, each analysis on a brake disc side comprises an analysis for each frame of the digital video that is captured on said side, each frame analysis comprises an analysis on a portion of the frame depicting a respective portion of the zone of interest.

10. The method according to claim 9, wherein certain steps of the method are in common among all tests of said plurality of tests, while other steps are conducted individually on each frame or for each of a set of predefined frame portions and are extended to the entire test according to a nested structure, for each test, for each braking action, for each side of the brake disc, for each frame and for each predetermined frame portion.

11. The method according to claim 1, wherein said steps of identifying the zone of interest by generating a mask and applying the generated mask to each of the acquired digital images and/or digital video frames comprise processing, by means of a computer, a set of digital images or digital video frames deemed significant for analysis, wherein, for each digital image or digital video frame deemed significant, said processing step comprises:

forcing negative temperatures or temperatures lower than a lower temperature threshold to a low or zero value;

applying a filter to the digital image or video frame to reduce noise;

applying an Otsu segmentation to the digital image or video frame;

averaging per pixel on the time axis, obtaining a respective averaged digital image or averaged digital video frame;

applying an Otsu segmentation to the averaged digital image or averaged digital video frame to obtain a respective segmented digital image or segmented digital video frame;

recognizing the edges of the brake disc by means of an edge recognition algorithm, and removing the edges from the segmented digital image or segmented digital video;

refining the mask by means of an image cleaning algorithm, to finally obtain a processed digital image or processed digital video.

12. The method according to claim 11, wherein the step of obtaining processed matrix data further comprises transforming Cartesian coordinates associated with the indices of the matrices forming the frames into a polar coordinate system.

13. The method according to claim 11, wherein, if each test comprises multiple braking events, the set of digital images or digital video frames deemed significant for analysis comprises digital images or digital video frames taken from the last N braking events of the test, i.e., those in which the brake disc reaches the highest temperatures and is thus more visible with respect to a cold background of the image;

said edge recognition algorithm, in the recognizing step, comprises the Sobel Edge Detection algorithm;

said image cleaning algorithm, in the refining step, comprises the Binary Image Morphology algorithm, configured to perform functions of removing dirt and/or small gaps and/or small objects on the image.

14. The method according to claim 1, wherein said step of defining the area of analysis comprises:

dividing the braking band of the brake disc to be analyzed into three equal sub-zones, one inner sub-zone, one central sub-zone and one outer sub-zone, each sub-zone being intended to be analyzed;

or setting by an operator, by means of a command interface, and for each of the two portions of the framed braking band, at least one setting parameter adapted to define the area of analysis, wherein said at least one setting parameter comprises:

(i) angular width of the band of interest for the analysis;

(ii) a value for an inner radius and an outer radius on the band, adapted to delimit three sub-zones, one inner sub-zone, one central sub-zone and one outer sub-zone, each sub-zone being intended to be analyzed;

and wherein each pixel of the digital image or video frame is marked to indicate whether or not it belongs to the area of analysis, and if so, indicating to which sub-zone of analysis it belongs.

15. The method according to claim 1, wherein said step of performing a thermal analysis on the data related to the defined area of analysis to obtain information about the temperature evolution over each point of interest, and said step of identifying hot spots comprise:

identifying as a potential hot spot any region of an analysis zone having a higher temperature, by a given percentile, than an average temperature over the analysis zone itself;

for each potential hot spot, calculating the coordinates of a respective barycenter;

verifying one or more validity requirements on the potential hot spots, and identifying as a hot spot only a potential hot spot which meets said one or more validity requirements, wherein said one or more validity requirements comprise:

a. the area of the potential hot spot is greater than a minimum hot spot area threshold;

b. the barycenter of the potential hot spot is in a non-cold zone, wherein a zone is defined as cold if its average temperature is less by a given percentile than the temperature distribution on the braking band side under analysis, or less than the median temperature of said distribution;

c. the area of the potential hot spot is smaller than a maximum hot spot area threshold;

d. the distance between the radial coordinates of the barycenter of two hot spots is greater than a distance threshold, otherwise the two hot spots are considered as one and the information about the one with greater area is saved.

16. The method according to claim 15, comprising the further steps of:

calculating the temperature variation inside each zone;

if said temperature variation is within a predetermined limit value of temperature variation, recognizing the presence of a band on said zone.

17. The method according to claim 1, wherein said information about temperature evolution and/or about location/distribution of hot spots and/or bands and/or zones on the zone of interest of the surface of a brake disc comprises, for each of the identified hot spots:

information on position and/or area and/or zone and frame on which the hot spots were found and/or metadata identifying the braking event and/or test to which said information refers.

18. The method according to claim 1, wherein said step of providing said information about temperature evolution and/or about location/distribution of hot spots and/or bands and/or zones on the zone of interest of the surface of a brake disc comprises:

displaying the output of hot spot recognition, and/or displaying the time trend of the number of hot spots, in total or divided by zone, and/or displaying the data related to the presence or absence of hot bands for each frame, globally or divided into zones, and for each of the two sides of the disc, and/or displaying a re-elaborated version of the original digital video frames, and/or aggregating the re-elaborated digital video frames based on the output of the algorithm so as to recreate a video.

* * * * *